(12) United States Patent
Kim

(10) Patent No.: US 6,757,222 B1
(45) Date of Patent: Jun. 29, 2004

(54) DATA RECORDING METHOD OF REWRITABLE RECORDING MEDIUM

(75) Inventor: Hyun Mok Kim, Seoul (KR)

(73) Assignee: LG. Electronics, Inc., Seoul (KR)

( * ) Notice: Subject to any disclaimer, the term of this patent is extended or adjusted under 35 U.S.C. 154(b) by 914 days.

(21) Appl. No.: 09/599,603

(22) Filed: Jun. 23, 2000

(30) Foreign Application Priority Data

Jun. 23, 1999 (KR) ........................................ 1999/23725

(51) Int. Cl.[7] ............................................. G11B 21/08
(52) U.S. Cl. ............................... 369/30.07; 369/47.15; 369/53.24; 386/95; 386/125
(58) Field of Search ............................ 369/30.07, 30.25, 369/30.04, 83, 47.15, 47.16, 53.37, 53.45, 13.22, 116, 53.2, 47.28, 53.34, 59.21, 32.01, 30.09, 30.19, 30.05, 47.13, 47.11, 47.18, 53.24; 386/95, 126, 125, 54

(56) References Cited

U.S. PATENT DOCUMENTS

| | | | | |
|---|---|---|---|---|
| 5,377,167 A | * | 12/1994 | Maeda et al. ............ | 369/47.11 |
| 5,430,697 A | * | 7/1995 | Bu ............................. | 386/126 |
| 5,715,355 A | * | 2/1998 | Yonemitsu et al. ........... | 386/95 |
| 5,802,028 A | * | 9/1998 | Igarashi .................... | 369/53.24 |
| 5,848,038 A | * | 12/1998 | Igarashi .................... | 369/47.18 |
| 6,665,241 B2 | * | 12/2003 | Heo ........................ | 369/47.15 |

* cited by examiner

*Primary Examiner*—Ali Neyzari
(74) *Attorney, Agent, or Firm*—Birch, Stewart, Kolasch & Birch, LLP

(57) ABSTRACT

A method for recording data in a rewritable recording medium comprising the steps: of comparing the size of the sectioned interval unit of the recording medium with an input unit data to be recorded; and recording the unit data in the sectioned interval unit. A data track of the program area of the rewritable recording medium is sectioned into interval units of a predetermined size and data inputted by the user is recorded by the section interval unit, so that editing such as data rewriting in the sectioned interval unit is possible, which facilitates using of the rewritable recording medium. Also, since the data can be re-recorded partially, the durability of the recording medium can be extended.

20 Claims, 4 Drawing Sheets

| MUSIC NUMBER | INDEX | MUSIC | | | | AGGREGATE | | |
|---|---|---|---|---|---|---|---|---|
| | | MINUTE | SECOND | FRAME | | MINUTE | SECOND | FRAME |
| 00 | 01 | | | | | ABSOLUTE TIME OF STARTING FIRST PIECE OF MUSIC | | |
| 00 | 02 | | | | | ABSOLUTE TIME OF STARTING SECOND PIECE OF MUSIC | | |
| 00 | 03 | | | | | ABSOLUTE TIME OF STARTING THIRD PIECE OF MUSIC | | |
| ⋮ | ⋮ | | | | | ⋮ | | |
| 00 | 99 | | | | | | | |
| 00 | A1 | | | | | ABSOLUTE TIME OF STARTING FIRST PIECE OF MUSIC | | |
| 00 | A1 | | | | | ABSOLUTE TIME OF THE FINAL TRACK | | |
| 00 | A2 | | | | | ABSOLUTE TIME OF THE LEAD-OUT TRACK | | |

DATA RECORDING METHOD OF REWRITABLE RECORDING MEDIUM

BACKGROUND OF THE INVENTION

1. Field of the Invention

The present invention relates to a data recording method of a rewritable recording medium, and more particularly, to a method for recording data in a rewritable recording medium for which a data recording track is divided into section units of a certain size and inputted data is recorded by the section unit.

2. Description of the Background Art

Rewritable optical recording medium (CD-RW) is typically capable of recording data repeatedly.

FIG. 1 is a view showing a recording area of an optical recording medium, which includes, from inner circumference, a PCA for recording a control signal, a PMA for temporarily storing an index (TOC information) corresponding to a user input data during a process for recording the user input data, a lead-in area (TOC area) for recording the index (TOC information) that was temporarily recorded as the user input data is completely recorded, a program area for recording the user input data and a lead-out area for recording a data representing the end of the recording area.

FIG. 2 shows a data form of a reproduction list information (TOC information) recorded in the lead-in area of the optical recording medium, which includes a recording serial number area of pieces of music recorded in a program area, an index area for the music, a recording time area of recorded pieces of music, pre-reserved area, an area for adding the whole recording time of the recorded pieces of music.

After the user data, that is, music, is recorded in the program area and the information on the music is simultaneously recorded in the TOC area, when the recorded music is requested to be reproduced, data recorded in the target position of the program area in which the music desired to be reproduced was recorded is searched on the basis of the list information as recorded in the TOC area, and then reproduced.

In a data recording method for recording the user input data in the program area of the rewritable optical recording medium such as an optical recording medium or a CD-RW for music players, the data is not recorded on a track of the program area in a regularly defined length (unit data).

For example, when a data of a piece of music is desired to be recorded, since an area is not previously sectioned in preparation for recording the data of the piece of music, a pause interval is inserted into a data stream of the piece of music, so that the piece can be successively recorded.

Referring to the program area of the optical recording medium in which the data of the piece is recorded, disadvantageously, the piece recorded in a specific recording area thereof can: not be replaced with a new piece of music or be partially edited.

That is, as for pieces of music recorded in the program area of the optical recording medium, in case that the second piece of which recording time or reproducing time takes 3 minutes is replaced with a new piece of music having 5 minutes-taken recording time or reproducing time, the latter is to be recorded overlapped with a portion of a data of a third piece as recorded following the second piece.

Accordingly, with the rewritable optical recording medium in accordance with the conventional art, it's not possible to record a new data partially or to edit the recorded data. In case where a partial recording or editing is desired, the previous data as recorded in the optical recording medium should be erased for a fresh recording, which causes shortening of a durability of the optical recording medium.

SUMMARY OF THE INVENTION

Therefore, an object of the present invention is to provide a method for sectioning a program area of a rewritable recording medium which is capable of partially editing data recorded in the rewritable recording medium.

Another object of the present invention is to provide a method for recording data of a rewritable recording medium for which input data is sectioned to be recorded so that it can be partially edited.

To achieve these and other advantages and in accordance with the purpose of the present invention, as embodied and broadly described herein, there is provided a method for sectioning a program area of a rewritable recording medium including the steps of: sectioning a signal track of a program area of a recording medium inserted into a drive of a recording medium recording and reproducing apparatus to interval units of a predetermined size; and generating reproduction list information (TOC information) corresponding to a sectioned signal track and recording it in a predetermined area of the recording medium.

In order to achieve the above objects, there is also provided a method for recording data of a rewritable recording medium including the steps of: comparing the size of the sectioned interval unit of the recording medium with an input unit data to be recorded; and recording the unit data in the sectioned interval unit.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

Figure 1:
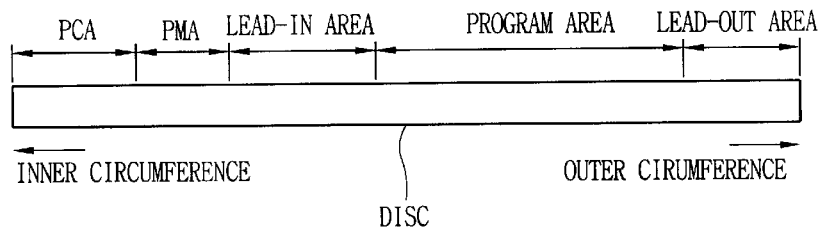
FIG. 1 illustrates recording areas of a rewritable optical recording medium in accordance with a conventional art.
Figure 2:
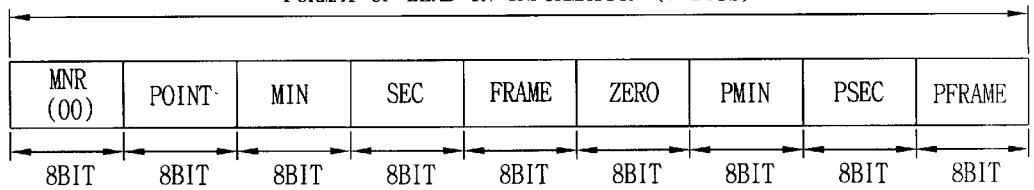
FIG. 2 shows data form of a reproduction list information (TOC information) recorded in a lead-in area of the rewritable optical recording medium in accordance with a conventional art.
Figure 3:
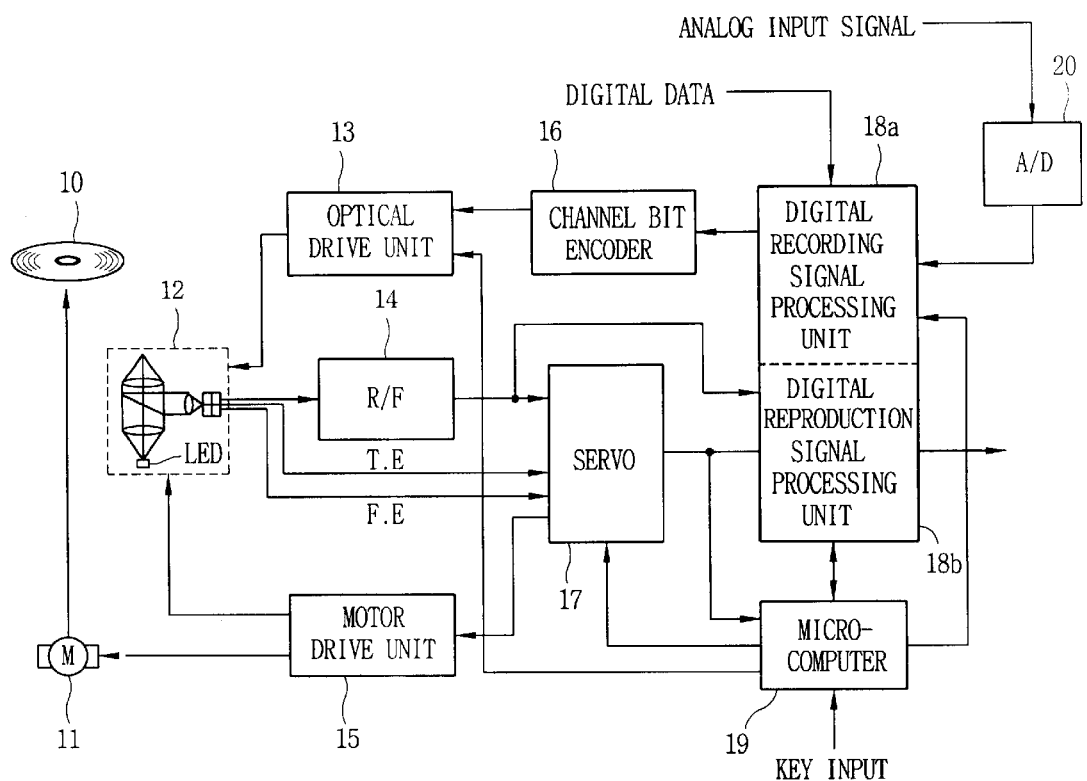
FIG. 3 is a schematic view showing a construction of a general optical recording medium recording and reproducing apparatus.

FIG. 3 is a schematic view showing a construction of a general optical recording medium recording and reproducing apparatus.

As shown in the drawing, the general optical recording medium recording/reproducing apparatus includes an A/D converter for converting an inputted analog signal to a digital data; a digital recording signal processing unit. 18a for adding an error correction code (ECC) to the digital data and converting it to a recording format; a channel bit encoder 16 for converting the data converted to the recording format to a bit stream; an optical drive unit 13 for outputting a light quantity drive signal according to an inputted signal; a pick-up unit 12 for recording an input signal to the optical recording medium 10 in accordance with the light quantity drive signal and reproducing a recorded signal from a recording surface of the optical recording medium; a motor drive unit 15 for driving a sled motor mounted at the pick-up unit 12 and a spindle motor 11 rotating the optical recording medium 10, an R/F unit 14 for receiving a signal from the pick-up unit 12 and wave-shaping it; a servo unit 70 for controlling the motor drive unit 15 by means of the tracking error (T.E) signal and a focus error (F.E) signal of the pick-up unit 12 and a rotation speed of the optical recording medium 10, and detecting a synchronous signal from a signal outputted form the R/F unit 14; a digital reproduction signal processing unit 18b for reproducing a compressed or recorded data or a recorded data in a PCM form from the wave-shaped signal to its original data on the basis of the detected synchronous signal; and a microcomputer 19 for controlling in a manner that the program area of the optical recording medium 10 is sectioned to interval units of a predetermined size and an input signal is recorded by the interval unit as sectioned.

Figure 4:
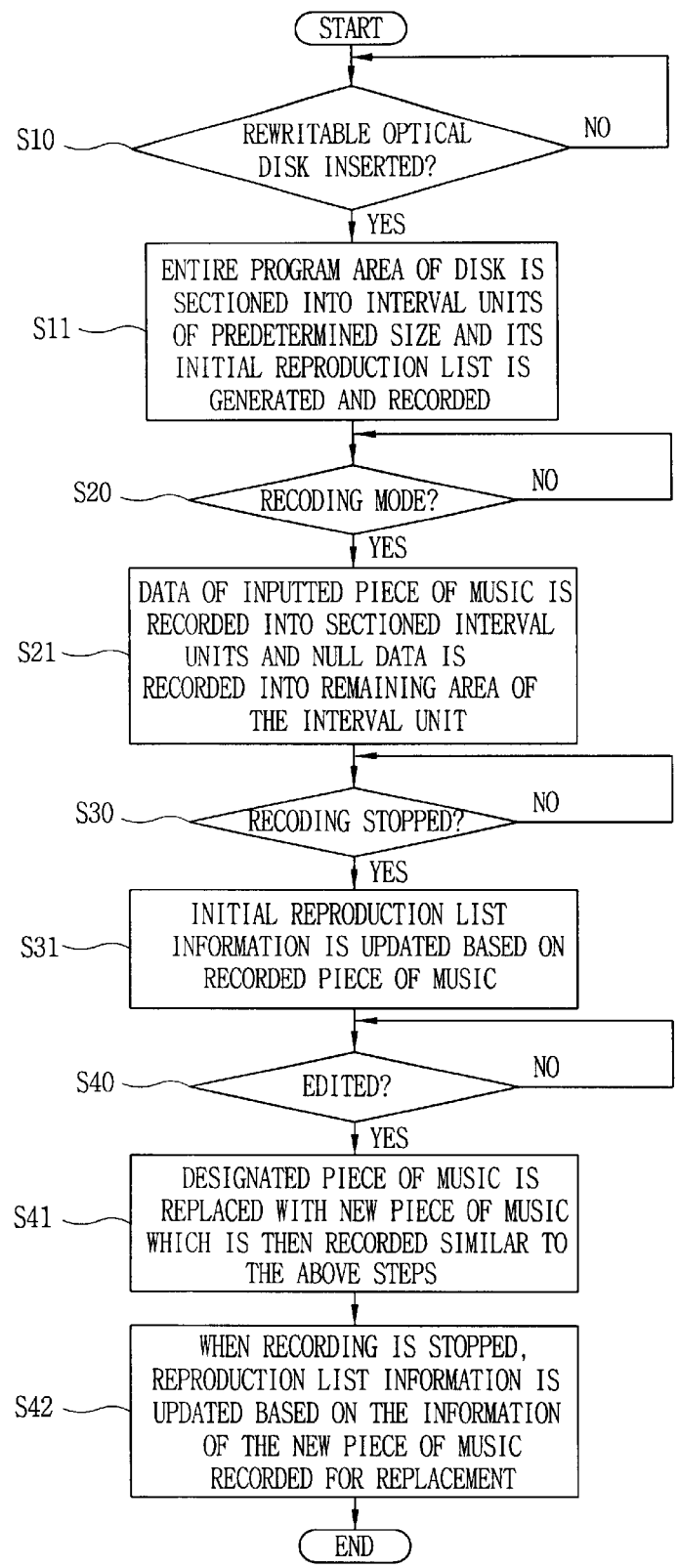
FIG. 4 is a flow chart of a method for recording data of a rewritable optical recording medium in accordance with the present invention.

FIG. 4 is a flow chart of a method for recording data of a rewritable optical recording medium in accordance with the present invention.

When the rewritable optical recording medium 10 is inserted into a drive for the optical recording medium (S10), the microcomputer 19 sections the program (data) area of the optical recording medium into interval units of a predetermined size.

Figure 5:
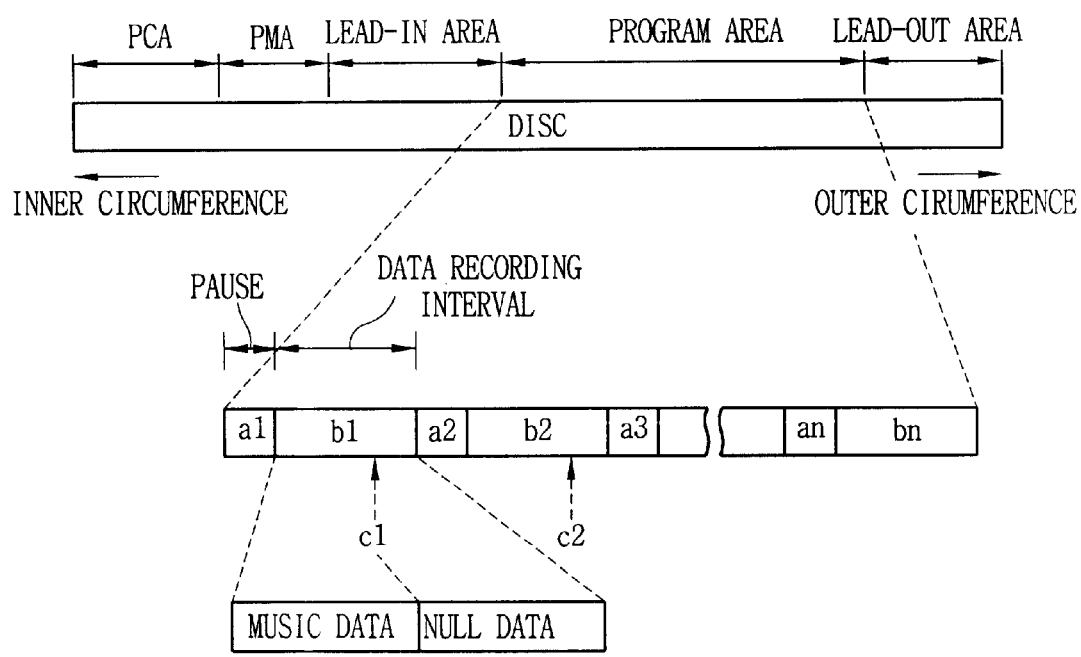
FIG. 5 illustrates recording areas of a rewritable optical recording medium in accordance with the present invention.

The interval unit, as shown in FIG. 5, signifies a pause interval plus a data recording interval. The pause interval may be determined by about 1 second (a1, a2, ... an), and the data recording interval may be determined by 5 minutes (b1, b2, ... bn), that is, for example, a sufficient size for carrying a piece of music.

When the program area is entirely sectioned to interval units, the microcomputer 19 records information on a starting position and ending position of the recording interval of the program area in the lead-in area of the optical recording medium 10, as initial TOC information (S11).

Of the TOC information recorded in the lead-in area, numbers of the pieces of music (that is, track numbers) are sequentially recorded in BCD-2 row in a MNR (music number) field. That is, as to the interval unit of the optical recording medium 10, in case where the program area of the optical recording medium 10 is divided equally into nine sections, data '00' representing a lead-in track and data '01'~'09' representing piece number are sequentially recorded in the MNR field. Accordingly, the recorded MNR information lets the user be informed of the overall piece numbers of music as recorded in the program area of the optical recording medium 10.

In a state that the program area of the optical recording medium 10 is sectioned into interval units of a predetermined size and the accordingly generated initial reproduction list information is recorded in the lead-in area, it is judged whether the optical recording medium is in the recording mode (S20). In the recording mode, a user input signal is recorded in the optical recording medium 10 through the following process.

An analog audio signal inputted from an external source is converted to a digital data by the A/D converter 20 and inputted to the digital recording signal processing unit 18a. In this respect, in case that a digital data is inputted from an external source, it is directly inputted to the digital recording signal processing unit 18a without the A/D conversion.

The digital recording signal processing unit 18a encodes the digital data for recording or reproducing, and adds an error correction parity to the encoded data to generate an error correction code (ECC block), and then outputs a digital bit stream. The channel bit encoder 16 converts the digital bit stream to a pulse width-modulated signal for recording on the optical recording medium 10 and outputs it to the optical drive unit 13.

In order to record the input signal in the optical recording medium by virtue of optimum optical drive current, the microcomputer 19 controls the optical drive unit 13. Then, the optical drive unit 13 applies a signal according to optical drive power to the pick-up unit 12, so that the pulse width-modulated signal is recorded in the program area of the optical recording medium 10.

FIG. 5 illustrates recording areas of a rewritable optical recording medium in accordance with the present invention.

With reference to FIG. 5, in case that the size of the unit data for a recorded specific piece of music is smaller than the sectioned recording interval of 5 minutes, that is, if the length of the whole data of a specific piece of music that is currently inputted merely covers as far as the position $c_1$ in the sectioned data interval $b_1$, the specific piece of music is recorded as far as $c_1$, leaving a remaining area in the interval $b_1$.

Then, the microcomputer 19 does not stop recording the specific piece of music, and controls the digital recording signal processing unit 18a to output a null data, so that the null data can be recorded from the position $c_1$ to the ending position of the interval $b_1$ (S21). In this manner, as the input data is recorded together with the null data within the single interval, recording operation is stopped.

In case that one piece of music is recorded in one interval unit, it is not necessary to correct position information on the piece of music, and thus, reproduction information such as a starting position and an ending position of the recorded interval unit is not recorded in the PMA area.

Meanwhile, in case that the size of the unit data for a recorded specific piece of music is larger than the sectioned interval unit of 5 minutes, the microcomputer 19 renders a unit data of the single piece of music to be recorded in the next interval as well as being recorded in the interval $b_1$ and the pause interval $a_2$.

That is, if the length of the unit data of the piece of music covers the interval $b_1$, the interval $a_2$ and up to the position $c_2$ of the interval $b_2$, the data of the piece of music is recorded from the interval $b_1$ to the position $c_2$, while a null data is recorded from the position $c_2$ to the ending position of the interval $b_2$, likewise in the above description.

As for starting position information on a third piece of music to be recorded, since a third piece of music was erased, the starting position information on the third piece is rendered to indicate, as being overlapped, the position information on the second piece, or index information on the recorded data is renewed by moving position information on the pieces followed the third piece one by one.

In the same manner as described above, the microcomputer 19 controls the optical recording and reproducing apparatus to record a unit data of the next piece of music that is successively inputted in the program area of the optical recording medium 10. While the unit data of the inputted piece of music is being recorded, if a recording stop command signal or an optical recording medium draw-out command signal is inputted from an external source (S30), the recording operation is stopped.

When the recording operation for the unit data of the piece of music is stopped in the optical recording medium, reproduction list information is generated for all the pieces as recorded in the optical recording medium 10 by referring to the information recorded in the PMA area of the optical recording medium 10, and the generated reproduction list information is recorded in the lead-in area so as to renew the initial reproduction list information as recorded in the lead-in area of the optical recording medium 10 (S31).

When the program area of the optical recording medium 10 is pre-formatted, in case that only three pieces were actually recorded in total although the program area was divided into nine sections, the microcomputer 19 changes the data '01'~'09' recorded in the MNR field of the reproduction list information to data '01'~'03', to thereby represent that three pieces were recorded in total.

Whenever a single piece of music is completely recorded in the program area, information corresponding to the piece of music is recorded in the PMA area (it is recorded by piece unit), and when a signal that commands to stop recording of the data of the piece is inputted in the program area, the reproduction list information is recorded in the lead-in area.

After the recording mode is stopped and the reproduction list information is recorded in the lead-in area, when a user intends to edit music recorded in the optical recording medium 10, that is, when the user designates a specific piece of music (a specific track) to replace it with other piece of music (S40), the microcomputer 19 searches a position of the specific piece of music designated by the user in the program area of the optical recording medium 10 by referring to the reproduction list information as recorded in the lead-in area.

After the position of the specific piece of music is searched, like the step 21 (S21) as mentioned above, the microcomputer 19 controls the optical recording and reproducing apparatus to record a unit data for the new piece inputted to be recorded for replacement in the searched position (S41).

In this respect, the microcomputer 19 compares the size of the designated piece of music with the size of the unit data of the new piece of music to be recorded for replacement, and if the size of the unit data of the new piece of music to be recorded for replacement is smaller than that of the designated specific piece of music, the unit data of the piece of music to be newly recorded for replacement is recorded in the position of the designated piece of music.

Meanwhile, if the size of the unit data of the piece of music to be newly recorded for replacement is larger than that of the designated piece of music, the microcomputer 19 asks the user whether the unit data is to be successively recorded, extendedly covering the next piece of music of the designated piece of music. If the user selects recording of the new piece of music to be recorded for replacement to extendedly cover the next piece (the next track) to the designated piece of music regardless of the length of the designated piece of music in the optical recording medium, the microcomputer 19 controls so that the unit data of the new piece of music to be recorded for replacement can be recorded covering the next piece of music to the designated music as recorded.

As to the recording method, like in the above descriptions, an inputted music is recorded by unit data by interval unit. And, when the unit data of the piece of music is completely recorded, the reproduction list information of the lead-in area is renewed:

In detail, in case that music 1 recorded in the interval b1 of the optical recording medium 10 is desired to be replaced with a new music 1, the new music 1 to be recorded for replacement is completely recorded in the interval b1 or extendedly in the interval b2 (the interval for music 2). Then, when the recording mode is stopped, the microcomputer 19 renews the reproduction list information as recorded in the lead-in area, so that the music information on the specific piece (music 1) is replaced with the information on the new music 1 for recording.

That is, in case that the information on the new piece of music covers the information on the piece of music previously recorded at the interval b1 or extendedly that of the piece of music previously recorded at the interval b2, the information on the piece previously recorded at the interval b2 is renewed by the information on the new piece of music for recording (S42).

In case where pieces are newly recorded for replacement in the optical recording medium, the total number of the previously recorded pieces of music may be changed. In this case, the microcomputer 19 renews the data of the NMR field of the reproduction list information.

When the recorded music is desired to be reproduced, the microcomputer 19 first recognizes the total number of the recorded pieces of music on the basis of the data recorded in the MNR field of the reproduction list information recorded in the lead-in area of the optical recording medium 10, based on which the microcomputer 19 reproduces a desired music.

In case that a null data is detected by the digital reproduction signal processing unit 18b during reproducing a data recorded at a specific interval of the program area of the optical recording medium 10, the microcomputer 19 stops reproducing with the null data interval and accesses a starting position of the next data recording interval, to reproduce a piece of music recorded in the starting position. Accordingly, an unnecessary data can not be reproduced during reproducing.

In the above described embodiment of the present invention, in order to record the inputted unit data by the sectioned interval units, the data may be recorded in the entire area of the sectioned interval unit by recording the silent data in a remaining area. On the other hand, in case that recording of the unit data is completed at a position within the sectioned interval unit, that is, at the position c2, a specific data may be recorded at the position to represent that a unit data is completely recorded. Also, in this case, when the specific data representing the completion of recording of the unit data is detected by the digital reproduction signal processing unit 18b during reproducing a recorded data at a specific interval, reproducing is stopped for the interval and a starting position of the next data recording interval is accessed, from which reproducing operation is performed successively.

As so far described, according to the method for recording data in a rewritable recording medium of the present invention, the data track of the program area of the rewritable recording medium is sectioned into interval units of a predetermined size and data inputted by the user is recorded by the section interval unit, so that editing such as data rewriting in the sectioned interval unit is possible, which facilitates using of the rewritable recording medium. Also, since the data can be re-recorded partially, the durability of the recording medium can be extended.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the meets and bounds of the claims, or equivalence of such meets and bounds are therefore intended to be embraced by the appended claims.

What is claimed is:

1. A method for sectioning a program area of a recordable medium comprising the steps of:
   sectioning a program area of the recordable medium into small unit areas having a predetermined fixed size;
   recording user data in said small unit areas;
   stuffing null data into a remaining area of a small unit area when recording of the user data stops in a middle portion of the small unit area; and
   recording information for distinguishing the user data from the null data recording.

2. The method according to claim 1, wherein said sectioning includes:
   forming a pause interval of a predetermined length at a front end portion of each sectioned unit area; and
   comparing the size of a sectioned unit area of the recordable medium with input user data to be recorded.

3. The method according to claim 2, further comprising a step of recording reproduction list information (TOC information) that is newly generated as inputted user data is completely recorded, for replacement of reproduction list information (TOC information) that is initially generated according to sectioning of the recordable medium, and recorded in a predetermined area, to thereby renew the reproduction list information.

4. The method according to claim 2, wherein the size of the input user data is predetermined.

5. The method according to claim 2, wherein as a result of the comparison result, if the size of the user data to be recorded is larger than the size of the sectioned unit area, the user data is recorded in the sectioned unit area and null data is recorded in the remaining area.

6. The method according to claim 2, wherein as a result of the comparison result, if the size of the user data to be recorded is larger than the size of the sectioned area, the user data is recorded in plural areas that can accommodate the size of the user data and null data is recorded in the remaining portion of the sectioned area.

7. A method for sectioning a program area of a recordable medium comprising the steps of:
   sectioning a program area of the recordable medium into small unit areas having a predetermined fixed size;
   stuffing null data into a remaining area of the small unit area when recording of user data stops in a middle portion of the small unit area; and
   recording information for distinguishing the user data from the null data recording, wherein said information is recorded at the position where the user data recording ends and the null data recording begins.

8. An apparatus for sectioning a program area of a recordable medium including:
   a microcomputer for sectioning a program area of the recordable medium into small unit areas having a predetermined fixed size;
   a first digital signal processing unit for stuffing null data into a remaining area of the small unit area when recording of user data ends in a middle portion of the small unit area; and
   a second digital signal processing unit for distinguishing the user data from the null data recording, wherein said information is recorded at a position where user data recording ends and null data recording begins.

9. A recordable medium having a program area wherein:
   a program area of the recordable medium is sectioned into small unit areas having a predetermined fixed size;
   user data is recorded in said small unit areas;
   null data is stuffed into a remaining area of the small unit area when recording of the user data stops in a middle portion of the small unit area; and
   information is recorded for distinguishing the user data from the null data recording, wherein said information is recorded at a position where the user data recording ends and the null data recording begins.

10. A method for recording data on a recordable medium comprising the steps of:
    recording input data on a predetermined data unit having a fixed size;
    stuffing null data into a remaining area of the predetermined data unit when recording of the input data stops in a middle portion of the predetermined data unit, wherein an information sufficient to show the fixed size is recorded on a predetermined portion of the recordable medium; and
    recording information for indicating stop of recording of the input data and start of stuffing of the null data, wherein the information is recorded at the position where the user data recording ends and the null data recording begins.

11. The method according to claim 10, wherein the size of the input data is predetermined.

12. The method according to claim 10, wherein the information sufficient to show the fixed size are the start and end addresses of the predetermined data unit.

13. A method for recording data on a recordable medium comprising the steps of:
    recording input data on a predetermined data unit having a fixed size; and
    stuffing null data into a remaining area of the predetermined data unit when recording of the input data stops in a middle portion of the predetermined data unit, wherein an information sufficient to show the fixed size is recorded on a predetermined portion of the recordable medium.

14. The method according to claim 13, wherein the size of the input data is predetermined.

15. The method according to claim 10, wherein the information sufficient to show the fixed size are the start and end addresses of the predetermined data unit.

16. A method for recording data on a recordable medium comprising the steps of:
    recording input data on a predetermined data unit having a fixed size;
    stuffing null data into a remaining area of the predetermined data unit when recording of the input data stops in a middle portion of the predetermined data unit; and
    recording information for indicating stop of recording of the input data and start of stuffing of the null data, wherein the information is recorded at the position where the user data recording ends and the null data recording begins.

17. The method according to claim 16, wherein the size of the input data is predetermined.

18. A recordable medium having
a data area for recording input data, wherein the data area is a predetermined data unit having a fixed size;
a null data area for stuffing null data provided when recording of the input data stops in a middle portion of the small unit area; and
an information area for recording information sufficient to show the fixed size.

19. The recordable medium according to claim 18, further including an information area for recording information for indicating stop of recording of the input data and start of stuffing of the null data.

20. The recordable medium according to claim 19, wherein the information is recorded at the position where the user data recording ends and the null data recording begins.

* * * * *